United States Patent [19]

Staude et al.

[11] Patent Number: 4,862,222
[45] Date of Patent: Aug. 29, 1989

[54] DOCUMENT FILMING APPARATUS AND PROCESS

[75] Inventors: Eckhard Staude; Juergen Kaus, both of Woelfersheim, Fed. Rep. of Germany

[73] Assignee: Staude Foto-Chemi Eva Staude, Fed. Rep. of Germany

[21] Appl. No.: 187,155

[22] Filed: Apr. 28, 1988

[51] Int. Cl.[4] .............................................. G03B 27/52
[52] U.S. Cl. ...................................... 355/40; 355/64; 355/77
[58] Field of Search ....................... 355/40, 41, 50, 64, 355/65, 77

[56] References Cited

U.S. PATENT DOCUMENTS

| | | | |
|---|---|---|---|
| 3,853,399 | 12/1974 | Walsh | 355/64 |
| 4,148,582 | 4/1979 | DeRyke et al. | 355/64 X |
| 4,283,621 | 10/1981 | Pembroke | 355/64 X |
| 4,444,490 | 4/1984 | Stark et al. | 355/40 |
| 4,577,945 | 3/1986 | Klosterhuber et al. | 355/40 |
| 4,636,061 | 1/1987 | Staude et al. | 355/65 X |
| 4,671,648 | 6/1987 | Watanabe et al. | 355/41 X |
| 4,757,352 | 7/1988 | Weinzierl et al. | 355/64 X |

FOREIGN PATENT DOCUMENTS

| | | |
|---|---|---|
| 0154658 | 9/1985 | European Pat. Off. . |
| 3112494 | 10/1982 | Fed. Rep. of Germany . |
| 3220977 | 3/1984 | Fed. Rep. of Germany . |

Primary Examiner—Richard A. Wintercorn
Attorney, Agent, or Firm—Robert J. Koch

[57] ABSTRACT

A process for microfilming and determination and storage of document film position information and evaluation of the data for reproduction of the document from the microfiche. The document specific identification or search data of a document to be filmed is fed into a computer memory, which outputs the memory address location opened in the form of a code to identify the document and reserves additional data storage space under the address. During filming of the document, the position data determined by a coordinate slide of the camera, controlled by a stepping motor on the microfiche, is reproducibly stored in the reserved memory location of the computer under the document specific data. The code associated with the document to be filmed is read by the camera or fed into it and passed to a camera memory. The filming data determined by the camera during filming of the document is correlated with the memory, which contains the identification and search data of the document under the address code. The procedure is carried out by a device for automatic microfilming of documents of different formats and for development of exposed microfiche in a continuous process with a computer controlled combination of certain systems.

11 Claims, 3 Drawing Sheets

DOCUMENT FILMING APPARATUS AND PROCESS

BACKGROUND OF THE INVENTION

1. Field of the Invention

The invention relates to a process for filming and, in particular, microfilming documents and determination and storage of their film position data, and the evaluation of these data for document reproduction from the microfiche.

The invention further relates to an apparatus for the automatic microfilming of documents of different formats and development of exposed microfiche.

The invention further relates to a combination of a computer with a retrieval device, a camera or a projector for rapid location and reproduction of a document from a microfiche.

2. Description of the Related Technology

Microfilming is an outstanding method of preservation of documents of all types and/or for space saving location and reproduction of literature passages. Microfilming is especially suitable, and therefore used extensively, for very different applications, such as banks, libraries, industrial companies, institutes and patent offices, both domestically and abroad.

Cameras for microfilming are known where documents to be filmed are taken up individually by hand. The exposure of a microfiche is followed separately and with a special camera or specific auxiliary device by the filming of the title and the document identification. The individual microfiche of a series are counted by the operator, which for the exposure of the serial number and/or the date on the microfiche, must prepare an appropriate image and film it.

Following these operations, the microfiche is transported to an automatic developing device, known in itself, which puts out the exposed film in the developed and dried state.

Numerous users of the microfilm technology find it necessary to expose large volumes of documents, often with different formats, in the shortest possible time. In many applications, both the front and reverse side along with appropriate identification (not present in themselves on the documents) such as record numbers, film identifications, or the like must be reproduced. Operations of this type are highly labor-intensive with the devices known at this time and require much time. Furthermore, erroneous identifications are easily possible, so that the entire filming of, for example 94 documents, must be repeated.

European Patent Document EP-A 84 10 27 10, corresponding to U.S. Pat. No. 4,636,061, the disclosure of which is expressly incorporated herein, shows an apparatus of the inventor for microfilming and developing, whereby the automatic filming of a large number of documents is possible. The front and reverse sides of a document may be imaged selectively and simultaneously and counting is automatic. The same camera may film the title, a company identification, and a continuous and variable characteristic, such as for example the date, carried out in the same operation with the document filming, i.e., continuously, but the title itself is included and as a standing image.

With this known apparatus, filming is possible in a continuous or flow process. A still image process is possible by switching or replacement of a few structural elements. Such an apparatus is used in the present invention also.

SUMMARY OF THE INVENTION

An object of the present invention is providing a data memory for the documents to be filmed in a simple, safe and reproducible manner, with the memory containing document-specific data, such as search concepts, together with film and position data of the document on the microfilm to be produced. The position data may additionally be used for the actuation of a retrieval device, automatic camera or projectors.

DE 32 20 977 shows an apparatus and a process for filming of documents in a random order, whereby the documents are paginated and subsequently filmed while correlating a blip impulse code.

A process of this type is suitable only for use with roll films. An additional disadvantage is that the blip impulse code of every image filmed must be optically read and counted for the determination of the position of the image and of the document filmed, by a counting device. Consequently, only relative and no absolute search or position characteristics are available.

Every image of the document is provided with the same blip impulse code. The impulse codes may only be determined and utilized by summing, where defects on the film may readily appear. Such defects may be caused by dust particles and scratches on the film and lead to reproduction of unwanted documents rather than reproduction of desired documents.

A further disadvantage of the known process is automatic document pagination, whereby a certain sequence of numerals is printed in a defined and constant location of the document. It is therefore possible that numerals are applied to image elements of the documents, so that errors may occur in reading the numerals. Such a process is not suitable for applications encountering large volumes of different types and sizes which must be documented in a simple and safe manner and reproduced unambiguously.

The solution of the problem defined above therefore resides in the process of the invention. The document-specific search and identification date of a document to be filmed are entered in the memory of a computer. The computer outputs the address of the memory location opened in the form of a code identifying the document and reserves additional storage space under the address. During filming of the document, the position data of the document determined by a coordinate slide of the camera controlled by stepping motors on the microfiche are stored in the reserved memory location under the document specific code in a reproducible manner.

According to a further development of the invention, the document-specific code is printed as a bar code label by a printer connected with the computer and attached to the document in an appropriate location.

The document specific code and the position data of the document on the microfilm stored under said memory location address are entered to actuate a coordinate slide by means of its stepping motors, a retrieval device, or a camera, so that the image of a document to be reproduced is positioned.

To carry out the process according to the invention, the apparatus for automatic microfilming is electrically connected by interfaces with another external or internal computer with a memory to receive the document-specific data and a device to output a code containing the memory location or address of said document specific data and capable of connection with the document. The central guidance and control system of the camera system has its own electronic memory and a device for reading the code, which passes the code and the film and position data provided by the camera system of the photographically imaged document on the microfilm to the memory of the camera. All of the stored filming data in keeping with the code correlated with the document may be entered at the memory address in the associated and reserved memory location of the computer.

According to the invention, the output device of the computer may be in the form of a printer which produces a document-specific bar code or a corresponding machine-readable code on a label which may be attached directly with the document involved.

The device for automatic document input of the camera system includes a reader capable of reading the code located on the document to be photographed and containing the memory address of the computer which, directly or through a further memory of the guidance and control system of the camera, transfers the code to the computer as the memory address, together with the document-specific position values provided by the stepping motors of the camera system, and stores them in the computer memory under the memory address.

The computer is connected electrically by its interface to a control device of a retrieval apparatus, a projector or a camera for reproduction of the microimage of a document. The projector of the camera for positioning of a microfiche is equipped with a coordinate slide actuable by stepping motors.

The apparatus advantageously continuously microfilms and develops exposed microfiche by:

(a) a device for the automatic input and transport through an exposure device from a feed-in or input stack of documents of a given format, with a format adjusting device;

(b) an interchangeable objective lens camera with an exposure and mirror system for simultaneous imaging of the front and reverse side of the document and with an automatic film transport device;

(c) a camera with an exposure system for title and continuous identification filming;

(d) automatic film developing stage; and (e) a central guidance and control system with an input keyboard, a monitor and a processing arrangement.

DETAILED DESCRIPTION OF THE PREFERRED EMBODIMENT

Figure 1:
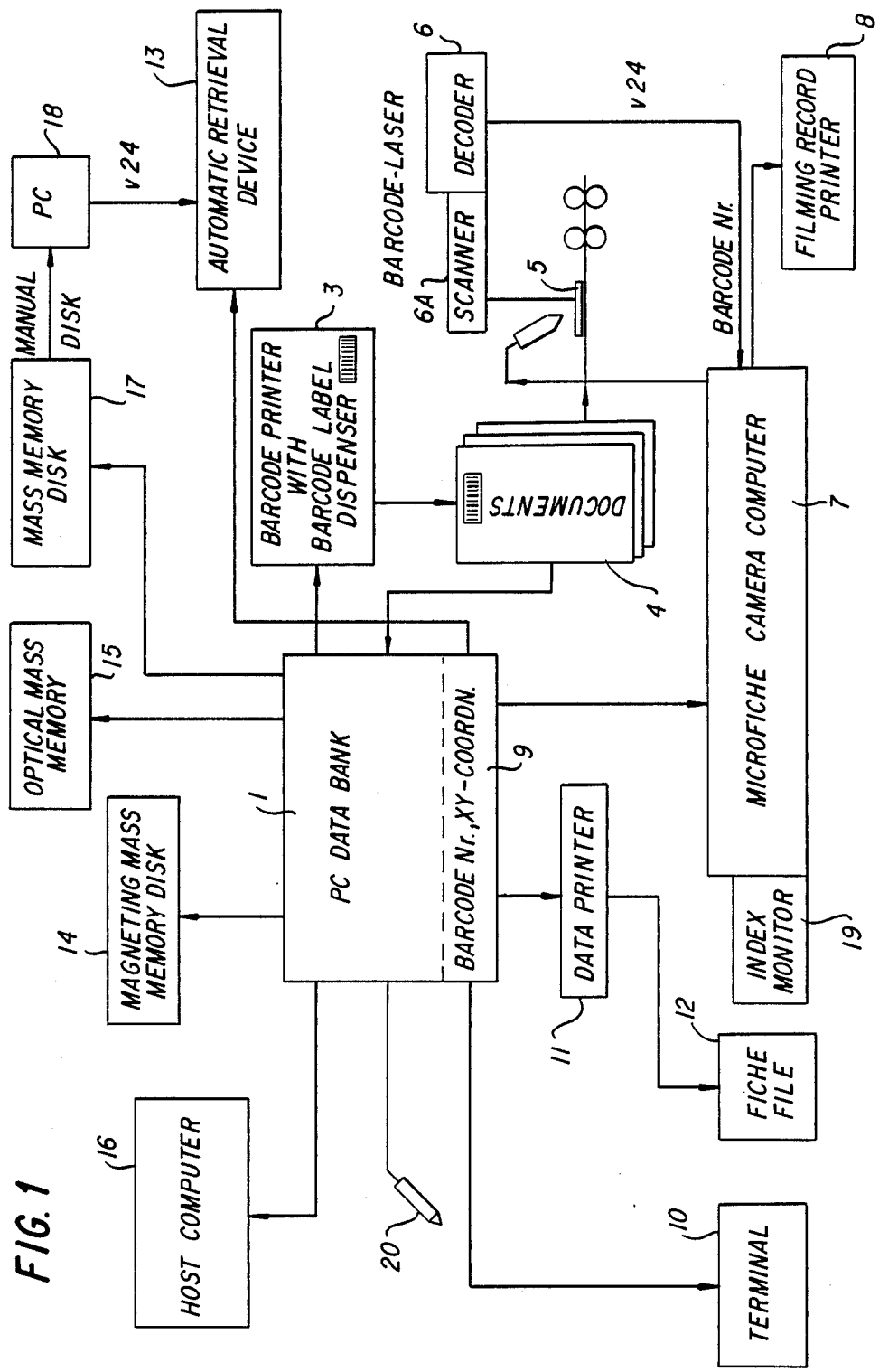
FIG. 1 shows a block diagram flow sheet of the entire apparatus.

The flow sheet of FIG. 1 is described below relative to the operation of the process.

FIG. 1 shows a computer 1, which may be an external computer with a PC (personal computer) data bank. A data bank is established in which stores the search concepts and other information identifying the items to be stored by microfilming. All data required to unambiguously identify a document are present.

Portions of the memory remain reserved for later addition of filming data. The address of the memory relating specifically to a given document is represented by a code such as a bar code. The bar code (as an identifying number) may be generated and assigned by the PC. Alternatively, the identification code represented in the bar code may be a number entered manually through the PC keyboard or a bar code reader pen 20. This identification code may advantageously be a number already present on the document.

According to a further alternative, the identification codes may be a continuous or arbitrary non-repeating identification bar code number taken off preprinted or rolled bar code labels.

A bar code printer 2 may be connected through an interface and print out a bar code label 3, which is applied in a predetermined position to a document 4.

Documents processed by application of bar code identification labels may be filmed at any time even in a random manner.

The microfiche camera includes a microfiche camera computer 7, a reader pen 6A, a laser reading device 6 such as a scanner coupled with a decoder and the appropriate interfaces V24.

In use, the automatic microfiche camera utilizes scanner 6 to read the bar code during automatic passage of the document to be filmed at the camera inlet 5. The bar code information is passed to the camera computer 7 through an interface V24.

An indication is generated if the scanner 6 does not read the bar code during the document input. The code may then be read with the reader pen 6A prior to filming.

It is possible to enter the code into the camera computer directly through a keyboard if the bar code reader pen cannot read the code.

If the material to be filmed includes both principal and ancillary documents, the principal documents are identified in the data bank and equipped with a bar code label. During filming, only the principal document is identified and the associated secondary items filmed subsequently. The principal documents may be the first documents in a group or cover sheets.

According to the invention, it is possible to expose data associated with the document by a second monitor 19 (see also FIG. 3) and a second objective lens in the camera in specifically provided index fields.

Following exposure of the fiche, the camera computer 7 enters the new filming data into the memory under the appropriate bar code number. Subsequently, the filming data is correlated with the memory location 9 reserved under the code of the data bank of the PC 1.

The camera computer 7 is capable of printing out this data on a printer 8 as a filming record.

The set of data completed in this manner now indicates the location of a specific document and the filming data at the terminal to a searcher. He can have data printed out on a data printer 11 and then find or retrieve his document from a fiche file 12 manually or by a retrieval device 13 connected through a serial interface on the microfiche.

If the memory capacity of the PC fixed disk 14 is exhausted, the data may be transferred to an optical mass memory 15, a large computer (host) or a disk 17 in the PC.

An advantage of the use of a disk 17 is that the data may be read locally by another PC 18.

This PC may be connected to an automatic search or retrieval device 13 or the search may enter the fiche file 12 to find his document on the microfiche.

It is possible with this process to simply and safely identify bookkeeping documents in electronic data processing, film them randomly and delayed in time on microfiche and subsequently or later find them by electronic data processing on the microfiche.

The automatic camera includes a combination of several devices monitored and controlled by the central computer 7. An input keyboard and a monitor 10 are provided for the entry of commands and certain identification codes and data for visual display.

This apparatus includes the following components:

A device for the automatic introduction and transport of a document, including an exposure and format adjustment device.

Figure 2:
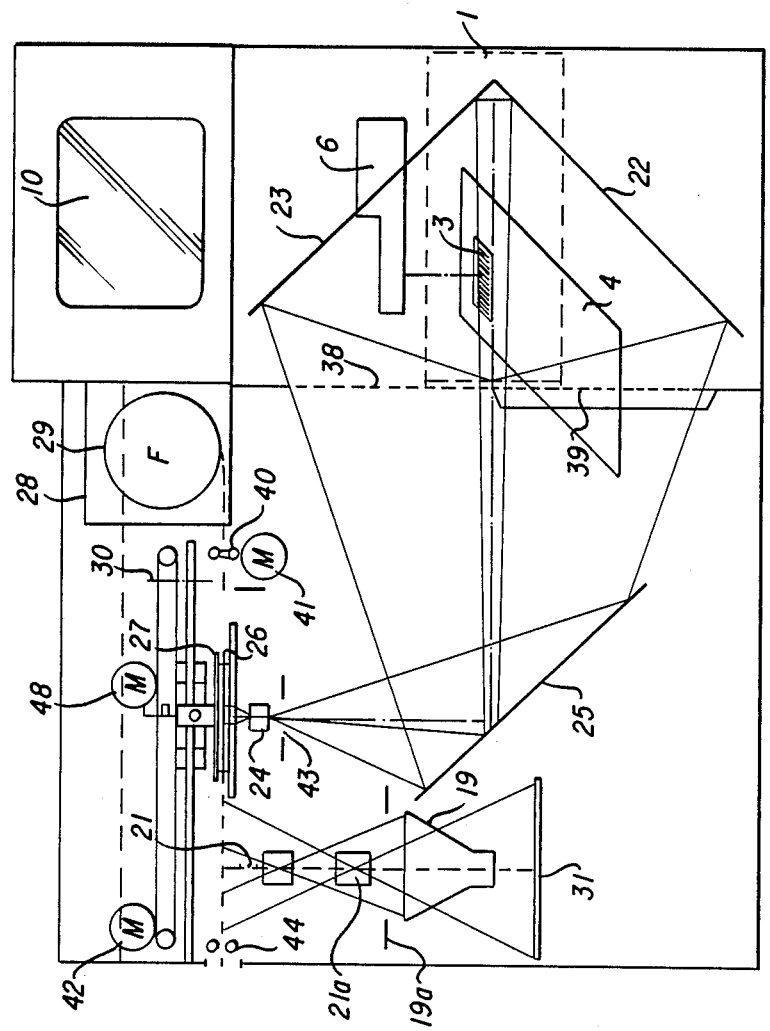
FIG. 2 shows a schematic view of the automatic camera apparatus according to the invention in a lateral elevation.

An interchangeable objective lens camera (as shown in FIG. 2) with an exposure and mirror system 22, 23, 25 for simultaneous imaging of the front and reverse side of the document, with an automatic film transport device.

A camera with an exposure system for filming titles and continuous identification.

Figure 3:
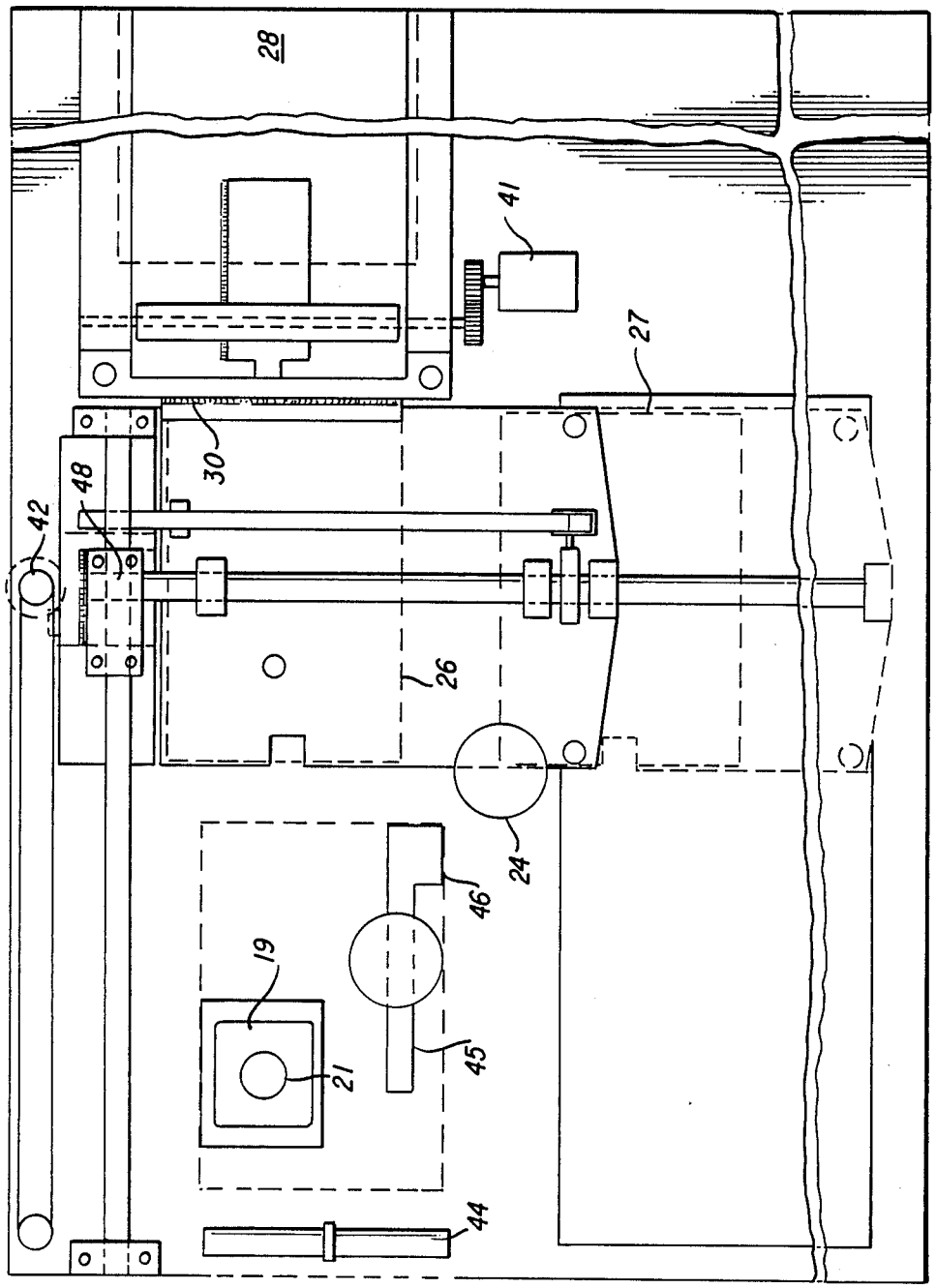
FIG. 3 shows a slightly enlarged schematic top view of the automatic camera apparatus.

The automatic camera according to FIG. 2 and 3 contains a film cassette 28 with a roll of film 29 and a subsequent automatically actuated cutting device 30. A slide 27 with a suction device takes the fiche 26 produced by the cutting device 30 and moves it to the appropriate image position, passing through in the continuous imaging process synchronously with the motion of the exposed document, or remaining in the imaging position during the exposure.

The slide 27 is equipped with a vacuum device to hold the fiche.

To coordinate the images on the fiche, the motion of the slide 27 takes place in a given grid, variable as a function of document size, with the aid of a processors guidance.

The mirror 23 located above an exposure plane reflects the front side of the document and the mirror 22, located under the exposure plane, reflects the reverse side of the document 4 onto a mirror 25. The mirror 25 is inclined by an angle of 135° to the exposure plane. Exposure slots 38 and 39 are provided between the mirrors 22, 23 and 25. In order to prevent the incidence of stray light, slot 39 is closed if the reverse side of the document is not filmed.

The same optical system may also be used for still image exposures. It is merely necessary to enlarge the mirrors so that the entire document is imaged at the same time, as the document and the fiche must be stationary at the instant of the exposure.

A light impermeable film cassette 29 is present in the exposure part of the interchangeable objective lens camera. The film cassette 29 contains a 105 mm wide and 30.5 m long panchromatic, high resolution microfilm. The unexposed film is drawn from the film cassette by transport rolls 40 driven by a motor 41, until a distance of 148 mm is attained between a light barrier and the cutting device 30. The film is then cut to this predetermined length. The cutting device 30 is a drop blade, which moves obliquely relative to the cutting plane.

The XY slide 27, which is driven by the motor 48 in the Y direction and the motor 42 in the X direction, moves over the cut DIN A6 (German Industrial Standard) fiche or flat film and grips it by a reduced pressure generated by a vacuum pump. The film lies absolutely flat under the slide 27.

All functions of the exposure part and the movement steps that the XY slide must carry out are controlled by the computer 7 of the camera in keeping with the optics and formats used and the grid. The slide transport is controlled so that exposures may take place at the predetermined locations of the fiche. The DIN A6 film may thus be exposed with very different patterns, as a function of the reduction factor and the size of the document. The grid also determines the number of exposures per fiche.

The position of each individual image is determined numerically or alphanumerically and recorded by the computer in keeping with the code of the document. The present camera is designed relative to programming so that it exposes the documents in the grid specified by the DIN standard. The positioning of the individual documents may also be recorded as codes on the fiche and/or on separate data carriers, as set forth above, so that these values may be used subsequently to find specific documents. Fundamentally, all conceivable grids may be used, as this is merely a question of programming.

In contrast to a known stepping camera, as soon as the document enters the imaging and exposure plane, the XY slide travels with the film continuously in counter flow and synchronously in the relationship determined by the reduction factor, until the frame line determined by the grid is attained. The counter flow motion results from the image reversing effect of the optical layout.

In the simplex process, i.e., if only one side of the document is to be exposed, the slide moves on the X axis into the next column when all of the images on the Y axis of the fiche are exposed. In the duplex process, i.e., both sides are exposed, the slide moves two columns on the X axis when all of the images on the Y axis are exposed. Simultaneously, the Y motor moves the XY slide back into the initial position of the imaging column of the fiche.

When the entire fiche is exposed or the document load intended for this particular microfiche are completed, the XY slide moves into the subsequent and integrated camera, which follows the interchangeable objective lens camera immediately with its own exposure system for filming the title and identification information. This moving process of the XY slide with the exposed fiche also is fully automatic under control of the computer 7. An auxiliary shutter 43 is provided under the optical device 24, i.e., in its beam path. The shutter 43 protects the film from stray light during its halt in the image frame, during its return movement, i.e., the so-called frame jump and when the camera is deactivated.

The subsequent objective lens 21a for identification filming serves to film a display 31, located on the object plane of the objective lens. This objective for identification filming is equipped with an electronically controlled diapositive insertion and transmission light device.

The display 31 may be in several strips or the XY slide 27 movement may be programmed with a cell jump for the successive imaging of the strip in case of a single strip display.

The display 31 is lettered either by a keyboard, not shown, or automatically in accordance with a continuous sequencing or insertion of a date, if so desired. A predetermined field is provided on the microfiche for insertion of the title so that in the customary standards a corresponding title slot 45 is provided.

A transmission lighting device must be provided for the filming of a transparency while the electronic display by the monitor 19 is self-illuminating. A special transparency slot 46 effects the correct field coordination on the fiche.

The camera according to FIG. 2 is followed directly by a microfiche transfer device 44, which takes the exposed fiche from the XY slide and transports it to a developing station.

The computer 7 of the camera further includes a keyboard and the monitor 19. The computer performs all control and regulating functions, together with operation monitoring and, depending on programming, may display the most important functions on the monitor 10.

The system may advantageously include a microfiche utilization device such as an automatic retrieval device, a camera, or a projector. The utilization device may include a fiche manipulation device for positioning the microfiche connected to the databank 1.

Particularly important is the display of the grid in the form of a template, wherein each exposed image is identified in the corresponding field. The operator is therefore able to ascertain which field of the grid has just been exposed and which of the fields are still free at all times.

We claim:

1. A microfilming method comprising the steps of: entering a document specific identification and search code into a computer;
   indexing a memory address corresponding to a document in accordance with said document specific identification code and reserving data storage space under said memory address;
   storing fiche image position data corresponding to a coordinate position of an image of a document on a fiche in said data storage space upon filming said document.

2. A method according to claim 1 further comprising the steps of:
   generating a machine-readable document specific identification code; and
   attaching said machine-readable document specific identification code to a document.

3. A method according to claim 2 wherein said machine-readable document specific identification code is a bar code label.

4. A method according to claim 2 wherein the step of entering further comprises the step of:
   machine reading said identification code from a document; and
   said step of storing further comprises the step of:
   generating said fiche image position from a stepped position of a document filming camera.

5. A method according to claim 4 further comprising the step of:
   entering said document specific identification code and said position data stored in said data storage space, on said fiche to actuate a coordinate slide, associated stepping motors, a retrieval device and a projector or camera so as to position a document image to be reproduced.

6. An apparatus for microfilming documents comprising:
   means for automatic microfilming of variously formatted documents and contiguously developing exposed microfiche containing
   means for automatic introduction and transport of documents through an exposure station from a stack of documents of a certain format inserted, with a format adjusting device;
   a first interchangeable objective lens camera with an exposure and mirror system for the simultaneous imaging of document front and reverse sides coupled to an automatic film transport;
   a second camera with an exposure system for filming titles and continuous identifications in line with said interchangeable objective lens camera;
   an automatic film developing device; and
   a central position guidance and control system for positioning a plurality of document images on said microfiche with an input keyboard, a monitor and processor;
   means for associating a document specific identification code to a document located in a document transport path;
   means for reading said document specific identification code connected to said central position guidance and control system;
   first memory means for storing film and position information in a reserved storage location wherein an address of said storage location is indexed in accordance with said document specific identification code.

7. An apparatus according to claim 6 wherein said means for associating comprises:
   means for attaching a machine-readable label containing said document specific identification code to a document.

8. An apparatus according to claim 7 wherein said means for associating comprises a bar code printer and said document specific identification code is a bar code.

9. An apparatus according to claim 6 wherein said central position guidance and control system comprises:
   stepping motors for positioning said document image and outputting position values reflecting a document image position; and
   a second memory connected to said means for reading and said first memory means.

10. An apparatus according to claim 6 further comprising:
    a microfiche utilization device exhibiting a coordinate slide for positioning a document image connected to said first memory means.

11. An apparatus according to claim 6 wherein said means for automatic microfilming further comprises:
    an objective for filming a shuttered monitor image associated with said second camera; and
    wherein said automatic film transport exhibits a range extending to a title and identification imaging position associated with said second camera.

* * * * *